(12) United States Patent
Dharamshi et al.

(10) Patent No.: US 8,965,864 B2
(45) Date of Patent: Feb. 24, 2015

(54) METHOD AND SYSTEM FOR EFFICIENT EXECUTION AND RENDERING OF CLIENT/SERVER INTERACTIVE APPLICATIONS

(75) Inventors: Gautam Dharamshi, Mountain View, CA (US); Frederic Pepin, Candiac (CA)

(73) Assignee: SAP SE, Walldorf (DE)

( * ) Notice: Subject to any disclaimer, the term of this patent is extended or adjusted under 35 U.S.C. 154(b) by 2195 days.

(21) Appl. No.: 11/590,013

(22) Filed: Oct. 31, 2006

(65) Prior Publication Data
US 2008/0104025 A1    May 1, 2008

(51) Int. Cl.
G06F 7/00        (2006.01)
G06F 17/30       (2006.01)

(52) U.S. Cl.
CPC ............... *G06F 17/30896* (2013.01)
USPC ......................................................... 707/705

(58) Field of Classification Search
USPC ....................................... 707/104.1, 10, 100
See application file for complete search history.

(56) References Cited

U.S. PATENT DOCUMENTS

2006/0271834 A1 * 11/2006 Wang et al. .................. 715/500

* cited by examiner

*Primary Examiner* — Hosain Alam
*Assistant Examiner* — Eliyah S Harper
(74) *Attorney, Agent, or Firm* — Brake Hughes Bellermann LLP

(57) ABSTRACT

A method and apparatus for reducing network and processor bandwidth overhead when a client device fetches a Web page from a server. Presentation code is provided to mark view identifiers as well as indicate target areas of the Web page to be updated upon occurrence of selected events. The presentation code is further marked to indicate the target areas. Upon an event at the client the associated view identifier is located as well as the target areas for the event retrieved utilizing the marking information. Only the selected target areas are updated on the current Web page. A server-side optimization causes only the target areas to be rendered upon a request for the Web page.

13 Claims, 17 Drawing Sheets

METHOD AND SYSTEM FOR EFFICIENT EXECUTION AND RENDERING OF CLIENT/SERVER INTERACTIVE APPLICATIONS

BACKGROUND

The development of sophisticated Enterprise Resource Planning ("ERP") software applications typically involves the integration of processes running on a client device with processes running on a server. For example, a client device may run a browser with an event handling system, which communicates with an enterprise server over a network such as the Internet. The server responds to requests generated by the browser and event handing system, serves data to the client and/or updates presentation of the data on the client device.

Examples of Web-based applications include server page technologies ("xSP") such as active server pages ("ASP") from Microsoft or Java Server Pages ("JSP") from Sun Microsystems.

SAP AG provides a Web Application Server ("WAS") that enables new Internet applications to be combined with the transactional operations of ERP. One type of xSP application is referred to herein as a Business Server Page ("BSP") application. In a BSP application, the presentation of the enterprise Web-based application is organized into elements referred to as BSPs that correspond to individual views (i.e., the view element of the Model View Controller ("MVC") design pattern) for an application.

In BSP applications, the HTML or other presentation language code consumed by the client-side browser typically is generated on the server from BSPs that reside on the server and that are arranged in a tree-like structure. Presentation code refers to the code that is interpreted by a Graphical User Interface ("GUI") program such as a browser, which then displays a GUI based on the presentation code. For example, HTML is presentation code in that it provides a set of tags to indicate how data should be formatted and displayed by a browser.

A core part of a BSP application is BSP pages that include program code and HTML, which can be compiled by the server upon request to generate presentation code (typically ("HTML")). BSP pages are typically arranged in a tree-like structure.

Web-based applications or xSPs such as BSP applications-often provide limited interactivity because event handling requires that data travel a roundtrip from the client to the sever and back to the client. This roundtrip process includes detection of an event on the client device, submission of the request to the server, processing of the request on the server, transmission of the response back to the client, and finally post-processing (such as updating the presentation of data) on the client (typically through a callback function). If the request/response is synchronous (e.g., it uses HTTP Post and Get modes), the overall behavior of the application may be sluggish due to the blocking nature of the synchronous transaction. In a synchronous environment, only one HTTP transaction can be completed at a time. Thus, if a first HTTP transaction has been initiated it must be completed before a second HTTP transaction can be completed.

In addition, an event that triggers a request from the client to the server is often wasteful of processor bandwidth on the client and on the server because it may require the rendering of unnecessary portions of the HTML code. For example, with BSP applications, any event occurring on the client may require rendering of the complete BSP tree on the server in the in-order processing sequence, even though not all areas of the tree may need to be updated.

Processor bandwidth on both the client and server can be expended unnecessarily if pages are rendered that are not necessary as a result of the triggering event. In addition, this scenario is wasteful of network bandwidth because any unnecessary rendering on the server requires the transmission of the unnecessarily rendered pages between the client and server.

To improve the interactivity of xSP applications, a need exists for a mechanism to render only a portion of presentation code directly correlated to a triggering object.

SUMMARY

As described herein, only a portion of presentation code directly correlated to a triggering object may be rendered, which is herein referred to as delta rendering. The delta refers to the fact that only information that has changed on the Web page need be sent to the client. Such delta rendering may be executed in a synchronous or asynchronous manner.

In a general aspect, a method for updating at least one portion of a Web page is described, in which an event associated with a triggering object on the Web page is detected, and a triggering object identifier and an associated view identifier for the triggering object is determined. An update target area is located based on the associated triggering object identifier, the associated view identifier, and the target information, and the update target area on the Web page is updated.

In another general aspect, a system for updating only a portion of a Web page is described. The system includes a Web browser adapted to query a DOM ("Document Object Model") object associated with the Web page, a tag library, an event handler system, and an event intercept system. The tag library provides a first tag for identifying each view on the Web page and further for associating each of a plurality of objects on the Web page with at least one target area on the Web page and a second tag for identifying each target area on the Web page. The event handling system is adapted to receive a triggering object identifier and associated view identifier for a triggering object upon detecting a triggering event. The event intercept system is in communication with the event handling system and is adapted to update at least one target update area associated with the triggering object.

The details of one or more implementations are set forth in the accompanying drawings and the description below. Other features will be apparent from the description and drawings, and from the claims.

DETAILED DESCRIPTION

According to one embodiment, Asynchronous JavaScript and XML ("AJAX") can be utilized to provide for delta updates in a Web based or xSP application. From an implementation perspective, AJAX may be understood as a design methodology that provides an intermediary between the client and the server. AJAX is a web development technique for creating interactive Web applications that allows the exchange of small amounts of data between a client and a server so that the entire web page does not have to be reloaded each time the user makes a change at the client to the web page served by the server. Using AJAX technology, Web pages may respond quicker to user input than they otherwise would respond without with AJAX technology. The AJAX technique utilizes a combination of Extensible Hypertext Markup Language ("XHTML") and Cascading Style Sheets ("CSS") for marking up and styling information, the Document Object Model ("DOM") accessed with a client-side scripting language such as JavaScript, and an object referred to as the XMLHttpRequest object to exchange data asynchronously with the web server.

AJAX applications executed on the client side of a client-server system by manipulating the current page within the browser that presents the page using DOM methods. AJAX can be used for a multitude of tasks, such as, for example, updating or deleting records, expanding web forms, returning simple search queries and/or editing category trees, and allows theses tasks to be performed without fetching a full page of HTML each time a change is made to a page. Generally, only small requests need to be sent to the server, and relatively short responses are sent back. This permits the development of applications that are relatively interactive and that featuring relatively responsive user interfaces.

In addition, an AJAX application may operate in a asynchronous manner. This means that transactions need not occur in a sequential manner. In addition, the asynchronous nature allows AJAX applications to operate in a non-blocking manner. Non-blocking refers to the fact that multiple transactions may be in progress simultaneously (e.g., a first transaction that has not yet completed does not block subsequent transactions). The asynchronous nature of AJAX applications may be established by establishing a direct connection between client and server, for example using a non-blocking socket connection.

In addition, by generating the HTML locally within the browser, and only bringing down JavaScript calls and the updated data that is needed to display a modified page, Web pages developed using AJAX can appear to load quickly because the payload coming from the server is much smaller in size that it would be for a similar page generate in HTML or in XML.

Figure 1:
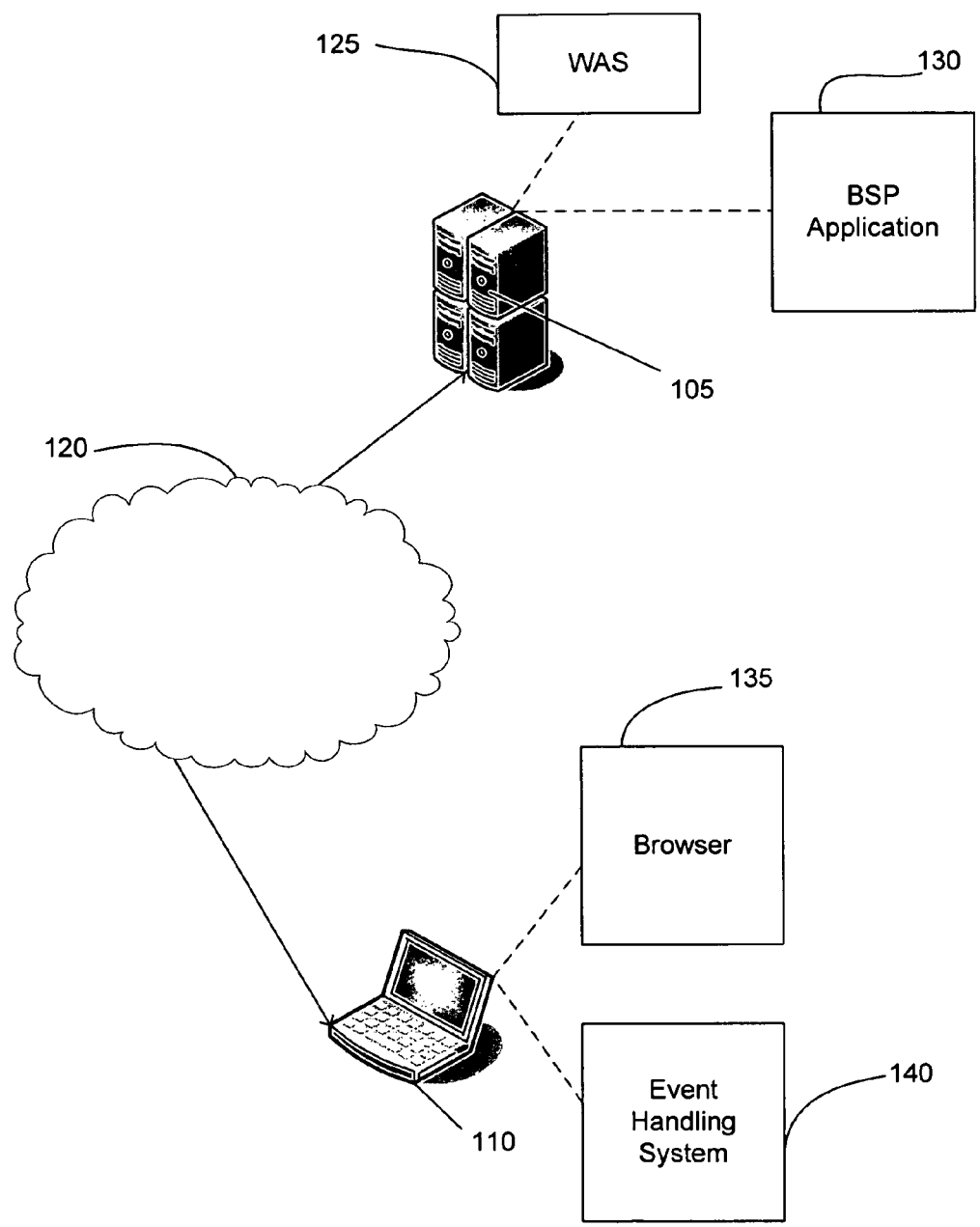
FIG. 1 is a schematic block diagram of various server and client components involved in the execution of a Business Server Page ("BSP") application.

FIG. 1 is a schematic block diagram of various server and client components involved in the execution of a Business Server Page ("BSP") application. Client 110 and server 105 communicate via network 120. Network 120 may be the a local area network ("LAN") such as an Intranet, or a wide area network ("WAN"), such as the Internet. Communication between the client and the server may occur via any communication protocol, for example, TCP/IP ("Transmission Control Protocol/Internet Protocol") and HTTP. Server 105 can store and execute a BSP application 130 (as described in more detail below). A Web Application Server ("WAS") 115 is a process that executes on server 110 and that is responsible for serving content related to the BSP application 130 to the client, execution and compilation of associated business and presentation logic associated with the BSP application, and storage of sensitive data in a centralized repository (not shown) accessible to the server 105. It should be understood that the term "Server" refers to the software process that provides server functionality, and not necessarily to a specific hardware device.

Client 110 may run browser 135 for presentation of data received from server 105. Browser 135 provides a Graphical User Interface ("GUI") to allow a user to interact with server 105 via network 120, for example, utilizing the HTTP protocol. According to one embodiment, browser 135 interprets a presentation language, such as HTML, and provides a GUI for interacting with BSP application 130. Client 110 may also execute an event handling system 140 that is responsible for responding to events that occur due to interaction with browser 135. Event handling system 140 may be integrated with presentation code consumed by browser 135, such as JavaScript code.

Figure 2A:
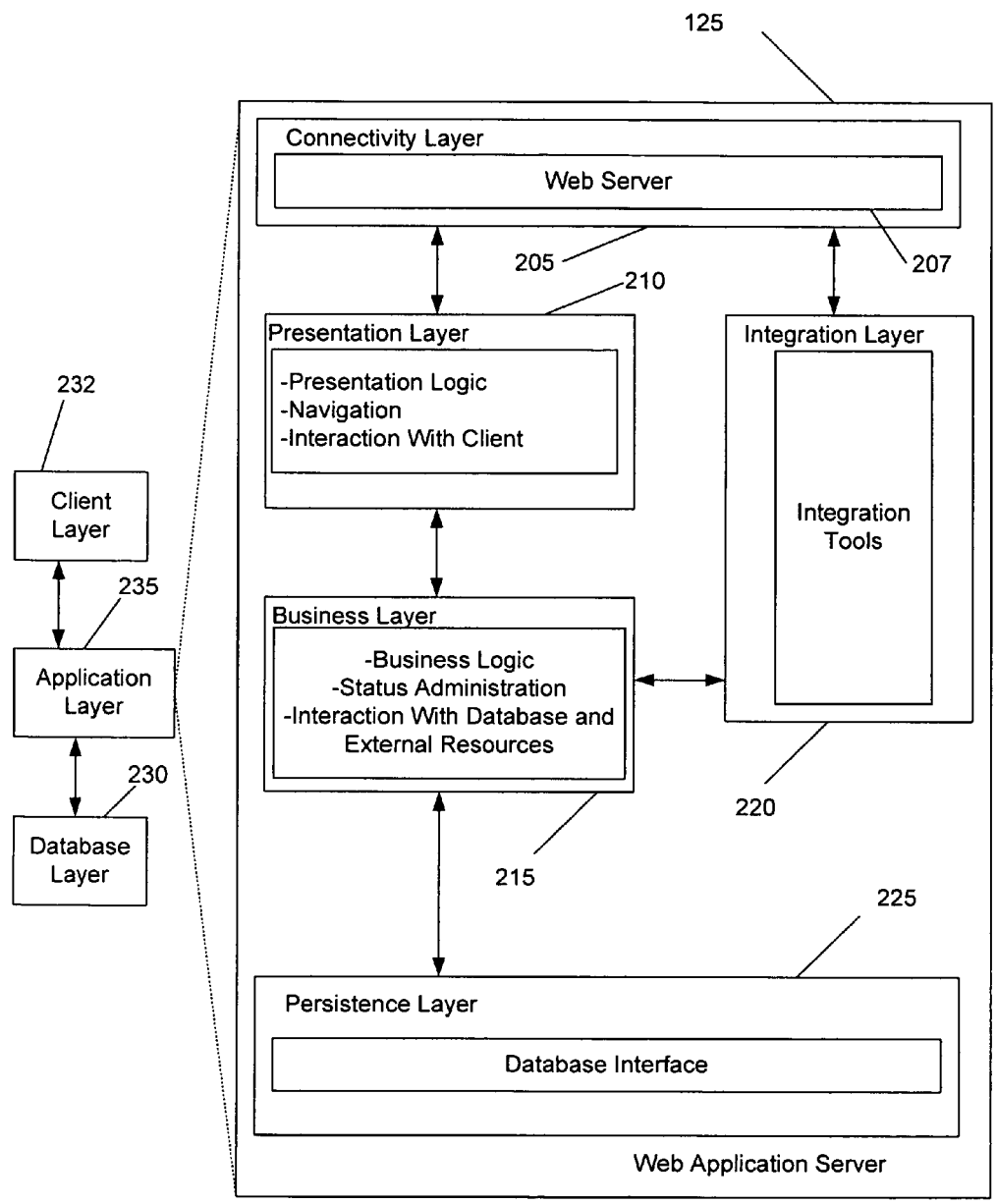
FIG. 2a is a schematic block diagram of a detailed architecture of a web application server ("WAS") and its relationship to a three-tier architecture.

FIG. 2a is a schematic block diagram of a detailed architecture of a web application server ("WAS") and its relationship to a three-tier architecture. Web-based applications (e.g., xSP applications) may be designed according to a three-tier architecture including a client layer 232, an application layer 235 and a database layer 230. Client layer 232 includes a user interface ("UI") that can run on a personal computer ("PC"), a workstation, or a mobile device. In the World Wide Web ("WWW") environment, a Web browser is usually installed on the client.

Application layer 235 represents a middle layer of a three-tier architecture and can provide necessary business logic, required system-oriented, services and connectivity that are required of the business logic. For Web applications, a Web server 207 may be used for communication between the client and the server via the Web. The WAS 125 can represent the unification of a Web server and an application server.

As shown in FIG. 2a, WAS 125 may reside at application layer 235. The WAS 125 may include a connectivity layer 205, a presentation layer 210, a business layer. 215, a persistence layer 225, and an integration layer 220. In connectivity layer 205, Web server 207 provides connections to clients through a range of supported protocols and Internet technologies (e.g., HTTP, HTTPS, SOAP, etc.).

Presentation layer 210 may provide a GUI, for example, in the form of a generated HTML page that is interpreted and presented to the user by browser 135. An HTML page may include both static components (e.g., text, graphics) and dynamic components such as, for example, Common Gateway Interface ("CGI") scripts, JavaScript code, server page script languages, and servlets.

Business layer 215 may provide the necessary business logic for a Web application. Complex business processes can be implemented on business layer 215 utilizing programming languages and infrastructure supported by the server environment.

Integration layer 220 provides access to business functionalities of external resources. Typically this is realized utilizing various interfaces, connectors (i.e., middleware), communication protocols, and support for general data exchange formats (e.g., Extensible Markup Language ("XML").

Generally, in sophisticated Web-based applications, Web pages are generated dynamically. This means that Web pages are not stored statically on the server but are instead generated from data that may reside in a database. Thus, with dynamically generated Web pages data often needs to be acquired, temporarily stored, and written to or read from a database. Persistence layer 225 utilizes an abstracted database interface to provide access to these functions.

Figure 2B:
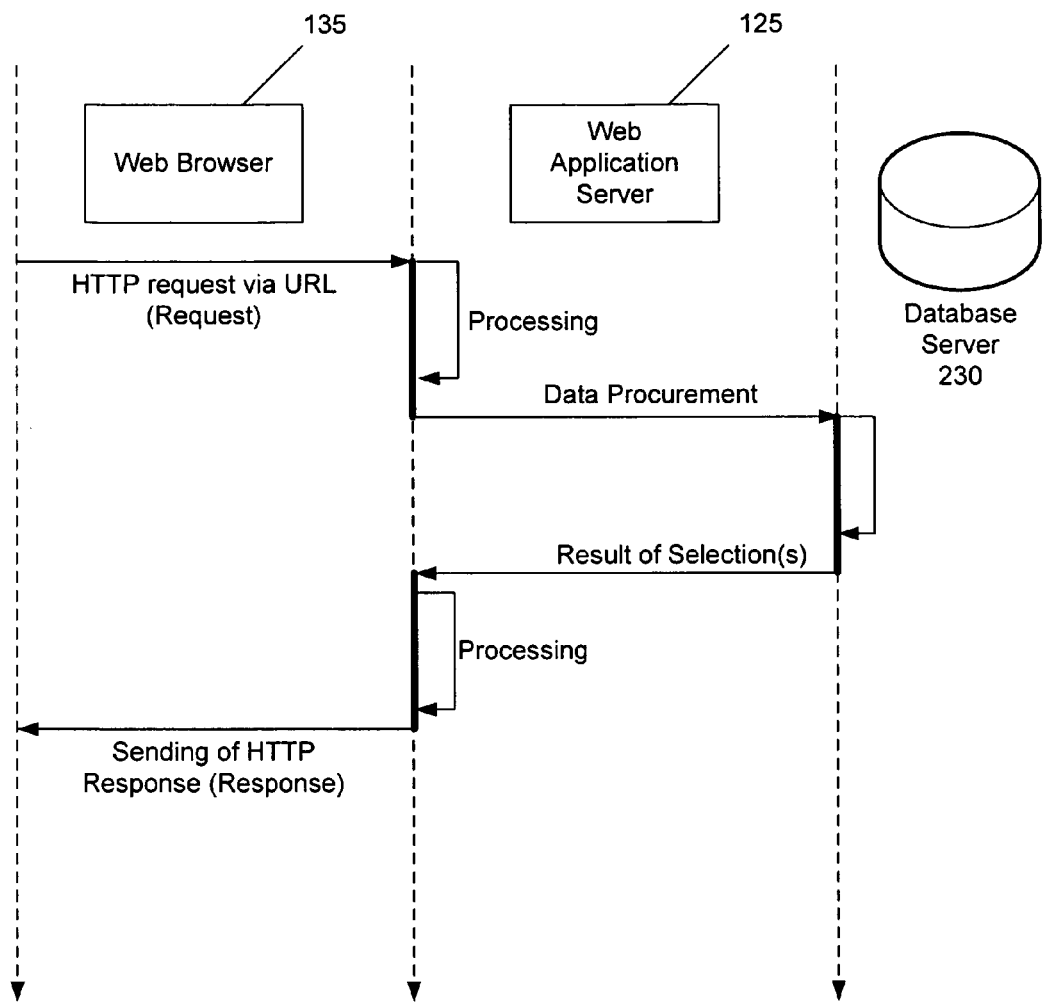
FIG. 2b is a schematic block diagram of relationships between a client layer, application layer, and database layer used in an application.

FIG. 2b is a schematic block diagram of relationships between a client layer, an application layer, and a database layer used in an application. Access to a Web-based application can be accomplished via a Uniform Resource Locator ("URL") using a Web browser 135 running on a client PC (e.g., as represented by client layer 232), which makes a request for data located by the URL. WAS 125 (e.g., as represented by application layer 235) can receive and process this request. The URL is utilized to detect which page and thus which part of the application should be called. This page identified by the URL then can be generated dynamically. The necessary business logic for generating and displaying the requested Web page can be processed within WAS 125 via business layer 215 and the resulting page (e.g., HTML page) can be compiled through presentation layer 210 (not shown in FIG. 2b). Persistence layer 225 can be utilized to access external databases and data for generation of the results page. The resulting page typically can be a HTML page with static and dynamic contents. WAS 125 returns this page to the browser 135 in the form of an HTTP data stream.

Figure 2C:
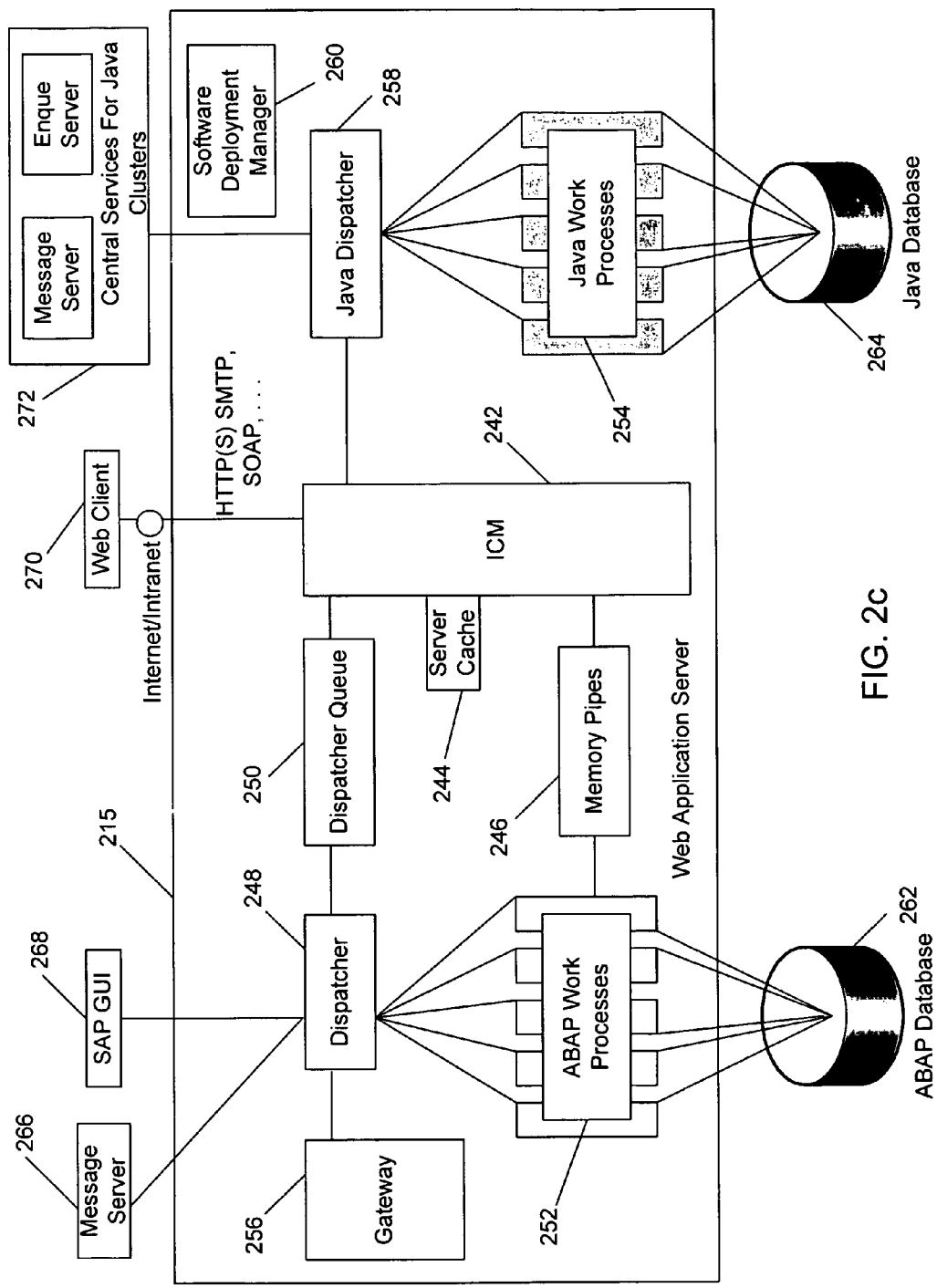
FIG. 2c is a schematic block diagram of a detailed view of a web application server.

FIG. 2c is a schematic block diagram of a detailed view of a web application server. The WAS 125 includes an Internet Communication Manager ("ICM"), which is an independent process responsible for communication between the WAS and clients over intranets or the Internet using standard protocols such as Hypertext Transfer Protocol ("HTTP"), Hypertext Transfer Protocol Secure ("HTTPS"), or Simple Mail Transfer Protocol ("SMTP"). The communication between the WAS 125 and clients may be conducted by the ICM 242 using a high-performance, memory-based communication channel that significantly improves Web site performance and scalability using dynamic and active content caching technology.

ICM 242 can be coupled to a server cache 244 that can store data frequently accessed by the ICM and to memory pipes 246 through which data can be exchanged with Advanced Business Application Programming ("ABAP") work processes 252. ABAP work processes 252 may conduct transactions to read data from and write data to ABAP database 262. Dispatcher 248 can manage system memory resources, organize communication between the processes and otherwise control initiation and execution of ABAP work processes 252. Dispatcher 248 can be coupled to dispatched queue 250 and gateway 256. Dispatcher queue 250 can store requests for various work process types. WAS 125 also is compatible with the Java runtime environment. ICM 242 can communicate with Java dispatcher 258 that controls execution of Java work processes 254. Java work processes 254 conduct transactions to read data from and write data to Java database 264.

Gateway 256 can facilitate communication between WAS 215 and other programs. Message server 266 is a process that serves to store information regarding available services, information that can be used for load balancing, and information that can be used for task distribution. WAS 125 communicates with the Web client 110 that may run browser 135.

ICM 242 may operate in either a server role or a client role. In the server role, ICM 242 can react to requests for data from a URL that identifies a server or port combination. To process such requests, assigned methods (handlers), which respond to certain events, can initiate a process and then return control to the runtime environment. Such a request could be addressed to a Web application within the ABAP stack of BSPs executing on the server. As described in more detail below, BSPs may contain server-side scripting along with a page description language or presentation language (e.g., HTML). This scripting can consist of ABAP instructions that require processing, which can be accomplished by a dispatcher 248 that calls a work process, which constructs a user context. The result of the processing (typically an HTML page) is then sent back to the ICM, and the result is executed through memory pipes and returned to the client as a response.

Figure 2D:
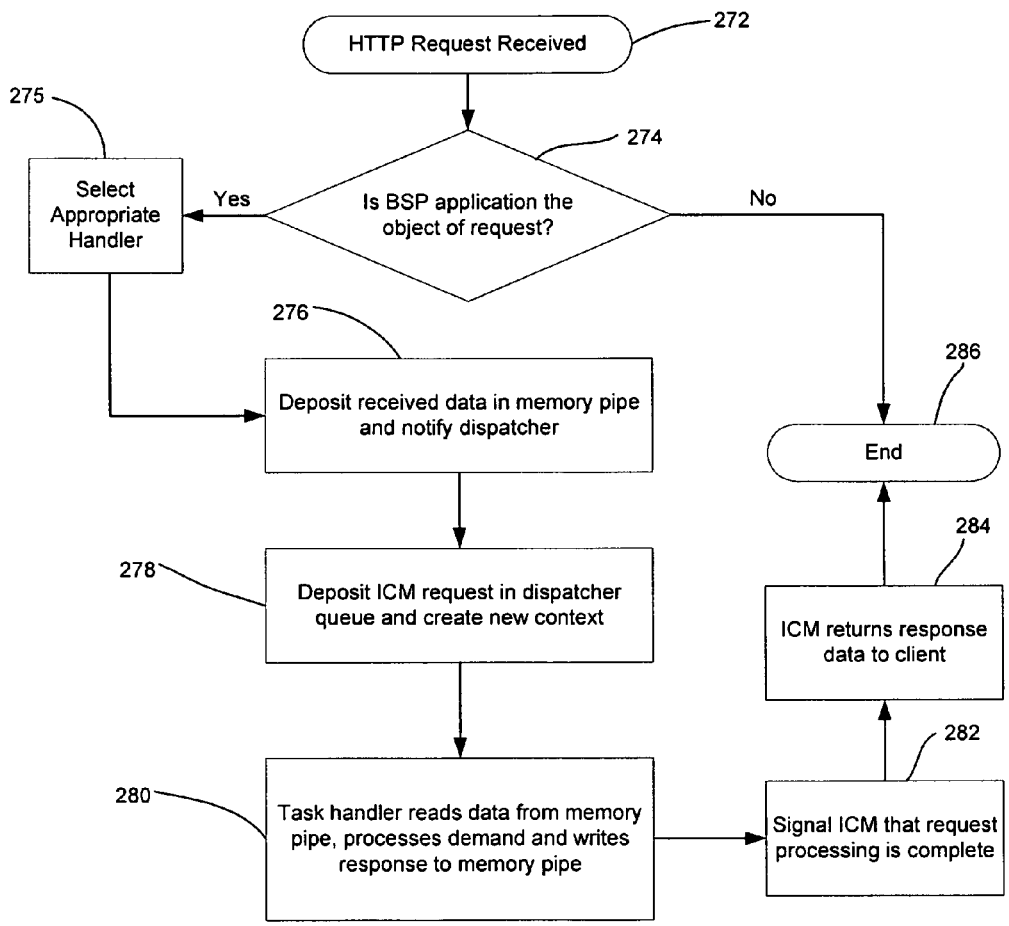
FIG. 2d is a flowchart of a method of operating an Internet Communication Manager ("ICM") as a server.

FIG. 2d is a flowchart of a method of operating an Internet Communication Manager ("ICM") as a server. The process is initiated in step 272 where an HTTP request is received. The HTTP request can include a URL containing the combination of a server name and a port that ICM 242 is monitoring. In step 274, ICM 242 can establish that a BSP application is the object of the request. If so ('yes' branch of step 274), in step 275 an appropriate handler can be selected. If not ('no' branch of step 274), the process ends in step 286. In step 276, ICM 242 can deposit the data received in a memory pipe in shared memory and notify dispatcher 248 that an ABAP context will be necessary.

In step 278, dispatcher 248 can place the ICM request in dispatcher queue 250, create a new context (if there is not already a context and the stateful condition is being used) and can select a work process for editing.

In step 280, the work process (e.g., a task handler) can read the data from the memory pipe, process the demand, and write the response in the memory pipes. In step 282, the task handler can signal the ICM 242 that the request processing is complete. In step 284, ICM 242 can return the response data to the client, and the process ends in step 286.

Figure 2E:
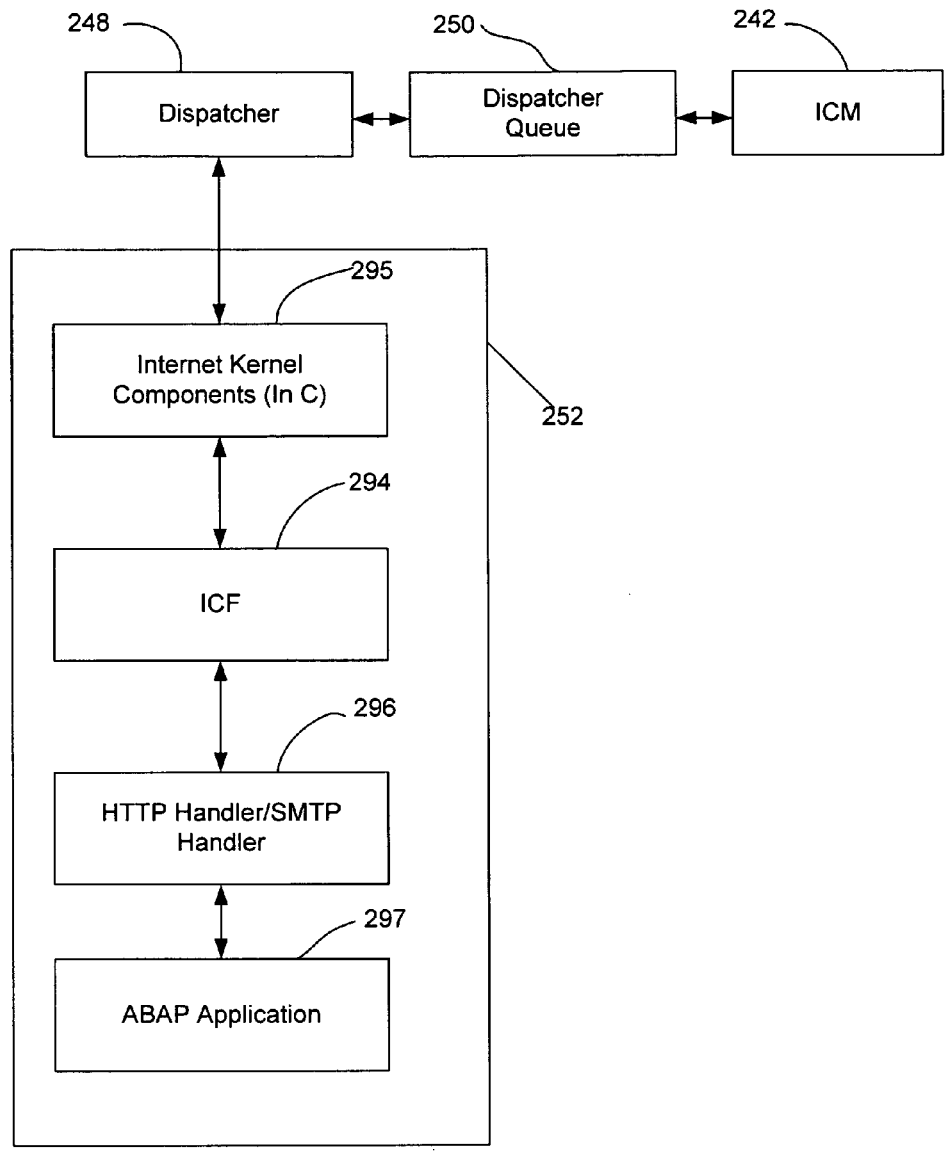
FIG. 2e is a schematic block diagram of relationships between an Internet Communications Framework ("ICF") and a work process and an ICM.

FIG. 2e is a schematic block diagram of relationships between an Internet Communications Framework ("ICF") and a work process and an ICM. The ICF provides an environment for handling HTTP requests/responses in a work process. ICF functions as a bridge between core Internet components written in the C language and in direct connection with ICM 242 and the actual ABAP applications.

Figure 2F:
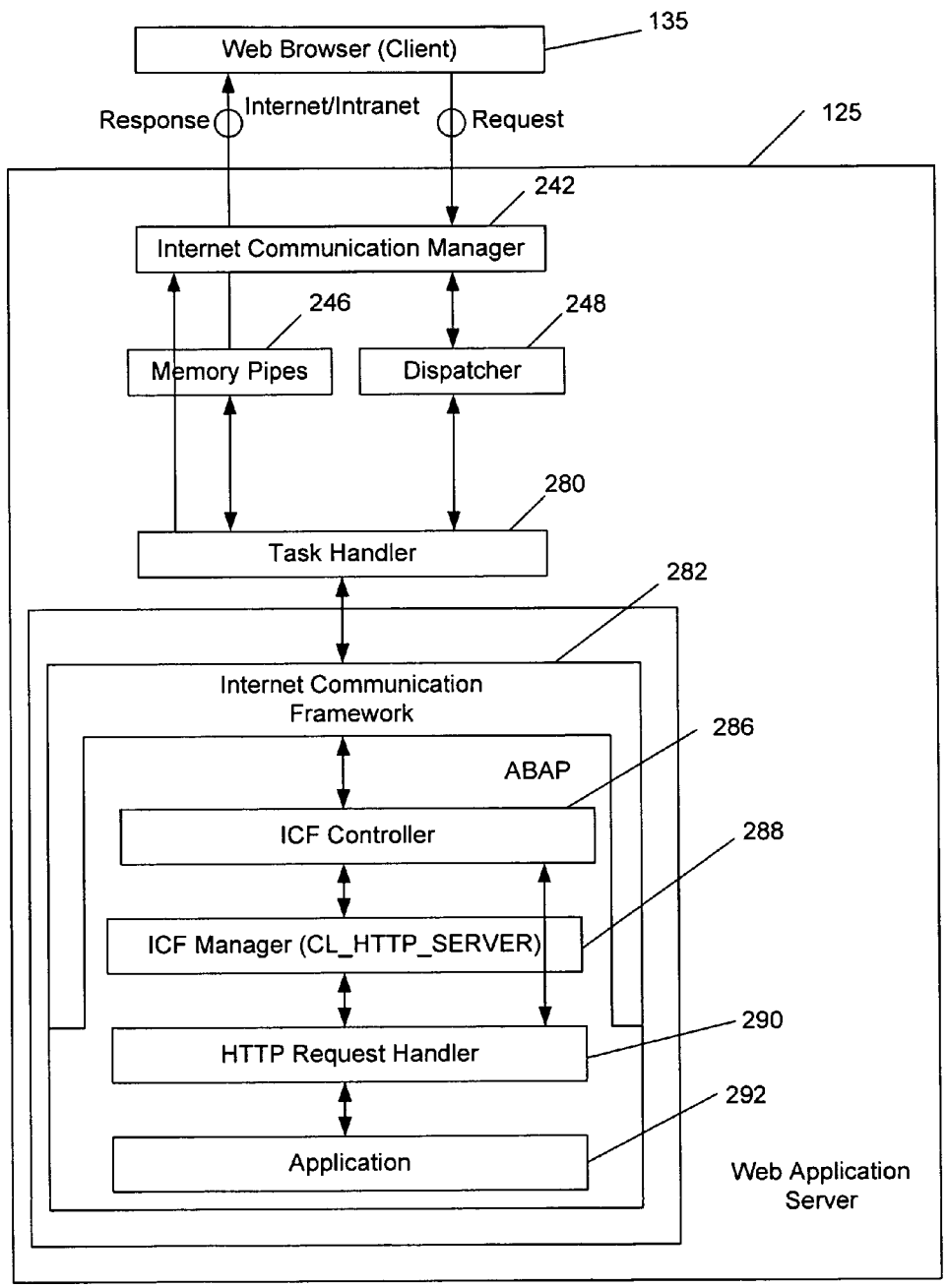
FIG. 2f is a schematic block diagram of system for operating an Internet communications framework.

FIG. 2f is a schematic block diagram of an ICF that can operate in a server role. HTTP request from Web browser 135 is received by ICM 242. Processing of the request is performed by a work process, which is initiated by dispatcher 248. For example, the request may be to display a BSP page. Control is then transferred to task handler 280 that starts ICF controller 286. ICF controller 286 creates an object referred to as a server control block that encapsulates all the necessary information (request, response, session ID, etc.) of the HTTP connection. ICF controller 286 imports the HTTP request and fills the REQUEST attribute of the server control block with this information. ICF controller 286 then uses the URL to determine which HTTP request handler should be called for processing. To do this, the URL is resolved (hostname, port, URL prefix) and a suitable ICF service entry is searched for. Web browser 135 is then authenticated for the requested service.

HTTP request handler 290 then starts the processing work by calling the HANDLE_REQUEST method. The request data can then be read by application 292 and processed. For the response, the RESPONSE attribute of the server control block is filled. By terminating the method, control is returned to ICF controller 286.

ICF controller 286 can now call further handlers that are deposited in the ICF service. If no other handler is stored there, the server control block is converted into an HTTP stream. ICF controller 286 then returns this stream to Web browser 135 via task handler 280 and ICM 242.

Figure 3A:
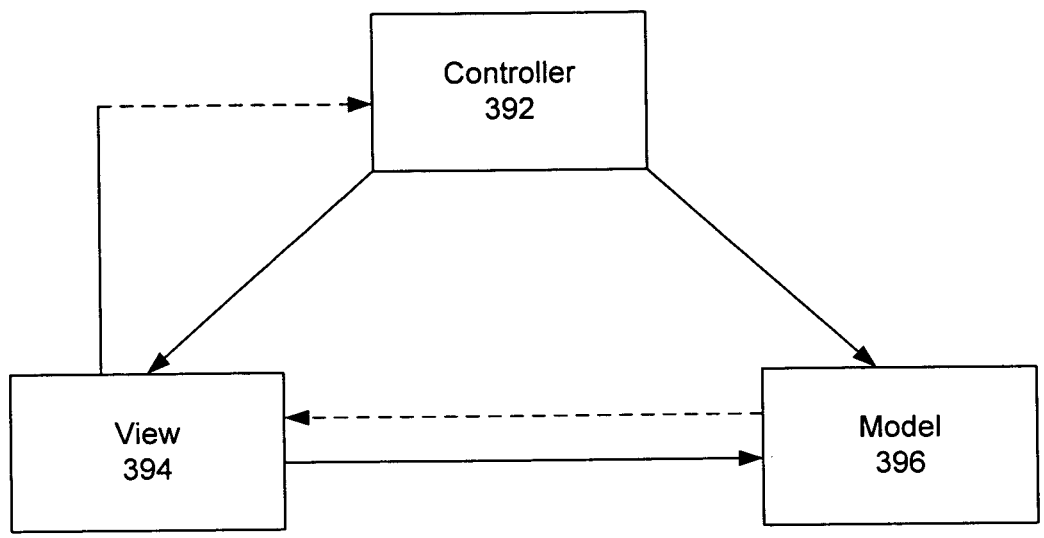
FIG. 3a is a schematic block diagram of a model view controller ("MVC") design pattern.

FIG. 3a is a schematic block diagram of a model view controller ("MVC") design pattern. The MVC design pattern includes model object 396, view object 394, and controller object 392. Model object 396 may represent enterprise data and business rules for an application and also governs updates and access to this data.

View object 394 may render contents of model object 396. It may access the contents of model object 396 and specifies how that data should be presented. View object 394 can render model 396 into a form suitable for interaction, for example, as a user interface element. For example, in the case of the WWW, view object 394 may be an HTML page and the code that generates dynamic data for the page. View object 394 may utilize model object 396 to generate an appropriate user interface and receive data from model object 396 for display.

Controller object 392 can process and respond to events (e.g., user actions with an HTML page) and invoke changes on model object 396 and possibly on view object 394. Controller object 392 may translate interactions with view object 394 into actions to be performed by model object 396.

Figure 3B:
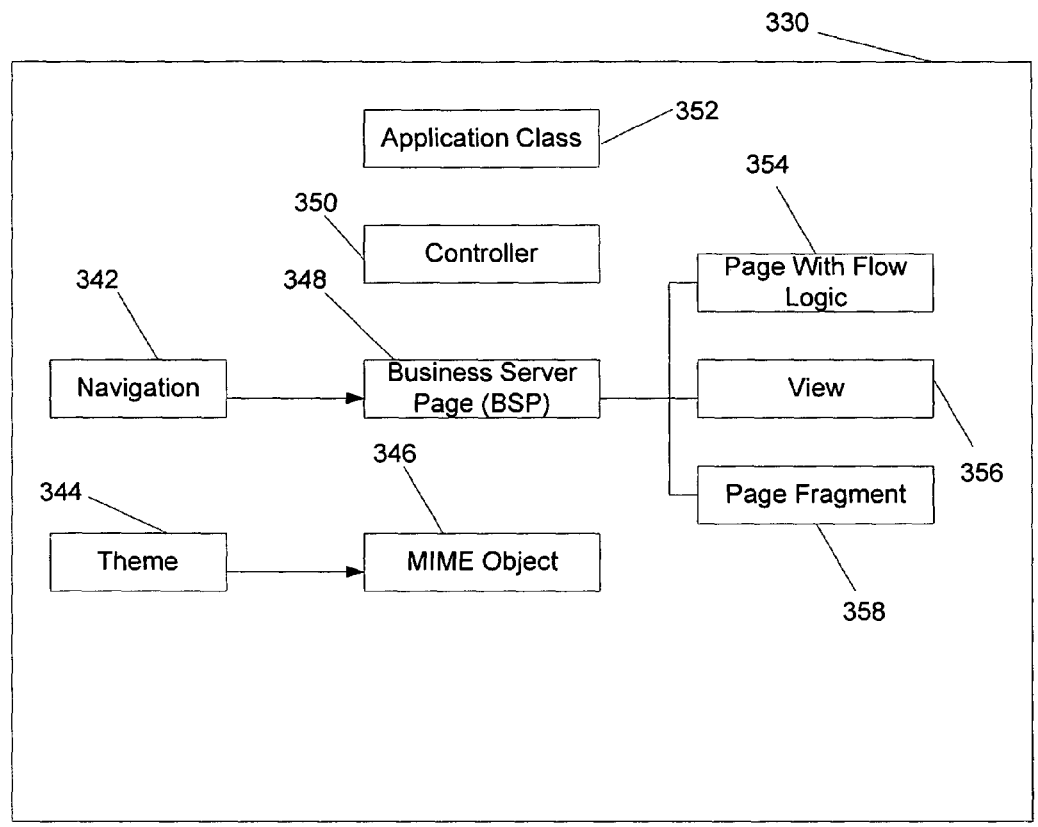
FIG. 3b is a schematic block diagram of components of a BSP application.

FIG. 3b is a schematic block diagram of components of a BSP application. BSP application 330 may reside at the presentation layer 210 of the WAS 125. BSP application 330 may be a standalone Web-based application that includes presentation, workflow and application logics that are self-contained. The presentation level of a BSP application 330 may include static Web pages or dynamically generated Web pages. Dynamically generated web pages, which contain server-side scripting, can be assembled to form a finished Web page during the runtime of the application server. Client-side JavaScript for dynamic actions without server roundtrip and client-side cookies for temporary storage of information also may be included in BSP application 330.

BSP application 330 may include any number of BSP pages 348, Multipurpose Internet Mail Extension ("MIME") object 346, application class 352, controller 392, and navigation structure 342. BSP page 348 may include view object 394, which is responsible for layout and visualization of application data. In particular, view object 394 may comprise code for generating a GUI to facilitate interaction with BSP application 330. According to one embodiment, upon request of a BSP page by client 110, code in view object 394 may be rendered into a presentation language such as HTML code that may be interpreted by browser 135 running on client 110. The format of view object 394 will be described in more detail below.

Each view object 394 has an associated controller object 392 that is responsible for filling attributes, accepting the request, and managing the flow control. Controller 392 may perform the tasks of providing data, selecting correct layout, triggering data initialization, executing input processing, and creating and calling a view instance for creating HTML/XML output. According to one embodiment, controller 392 may include business logic and application data.

In addition, BSP page 348 may include flow logic 354 that is implemented through event handlers and includes page attributes and type definitions. Flow control for BSP pages 348 can be achieved through event handlers (not shown), navigation structure 342 and controllers 350.

Navigation structure 342 may be used to define navigation requests for the start and destination of a request (i.e., the page order in the navigation process). MIME objects 346 may represent, for example, graphics, style sheets and audio and/or visual files that are managed in a central database. Navigation structure 342 can determine which navigation request is used to direct the navigation process from a particular page to a subsequent page. Application class 352 encapsulates business logic of BSP application 330.

According to one embodiment, a URL (not shown) can be associated with each controller 392 and may thereby function as the initial entry point for BSP application 330. Controller 392 can assess the data of an incoming request based on a model 396 and then select a suitable view 394 for rendering a response to the user. Controller 392 may call associated view 394 (which typically does not have a separate URL) and communicate with model 396.

BSP application 330 may also include page fragments 358. Page fragments 348 are similar to BSP pages 348 but do not have separate event handling, type definitions, or separate attributes and may be integrated into other BSP pages 348.

MIME object 346 is an extension of the original Internet e-mail protocol permitting the exchange of different data types through the Internet, for example, audio, video, and graphical data, style sheets, application programs, and ASCII files. MIME objects 346 can be stored in a MIME repository (not shown). Themes 344 are used to define replacements for MIME objects 346.

Application class 352 may encapsulate the application logic of BSP application 330. The application logic (business logic) handles the actual processing of data. Application logic can be created in the form of Business Application Programming Interfaces ("BAPI's"), function modules, or class libraries.

Figure 4:
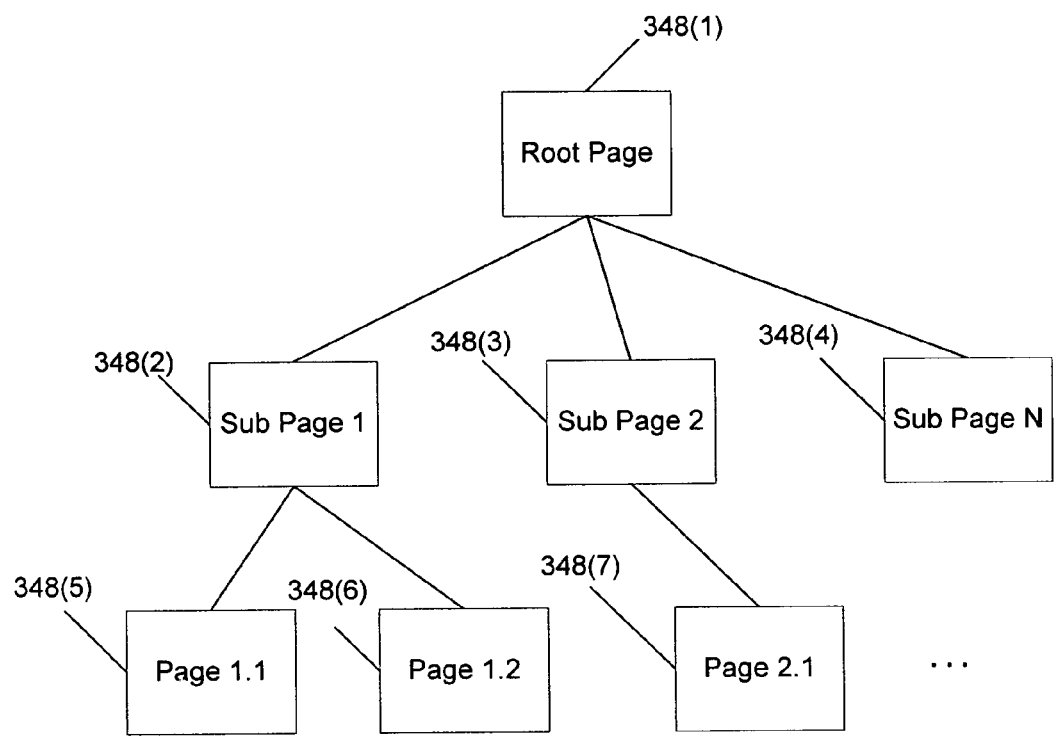
FIG. 4 is a schematic block diagram of a hierarchical structure of a plurality of BSPs.

FIG. 4 depicts a hierarchical structure of a plurality of BSPs. BSP pages 348 may be nested to include other BSP pages 348. For example, as shown in FIG. 1 a root 348(1) page may be associated with a plurality of sub pages 348(2)-348(4). The sub pages themselves may be further associated with their own sub pages. For example, sub page 1 348(2) is associated with page 1.1 (348(5)) and page 1.2 (348(6)). The tree structure depicted in FIG. 1 is merely illustrative may include any number of hierarchical levels.

The BSP framework creates a server-side page hierarchy (similar to a DOM tree). On the client-side this translates into a DOM tree, which is hierarchical and a replica of the server-side BSP pages 348. A DOM tree is an Application Programming Interface ("API") for HTML and XML documents. It defines the logical structure of HTML and/or XML documents and provides methods for accessing and manipulating portions of these documents. In particular, the DOM provides methods to allow any element, which are typically indicated via tags, of an HTML or XML document to be accessed, changed, deleted, or added.

Figure 5:
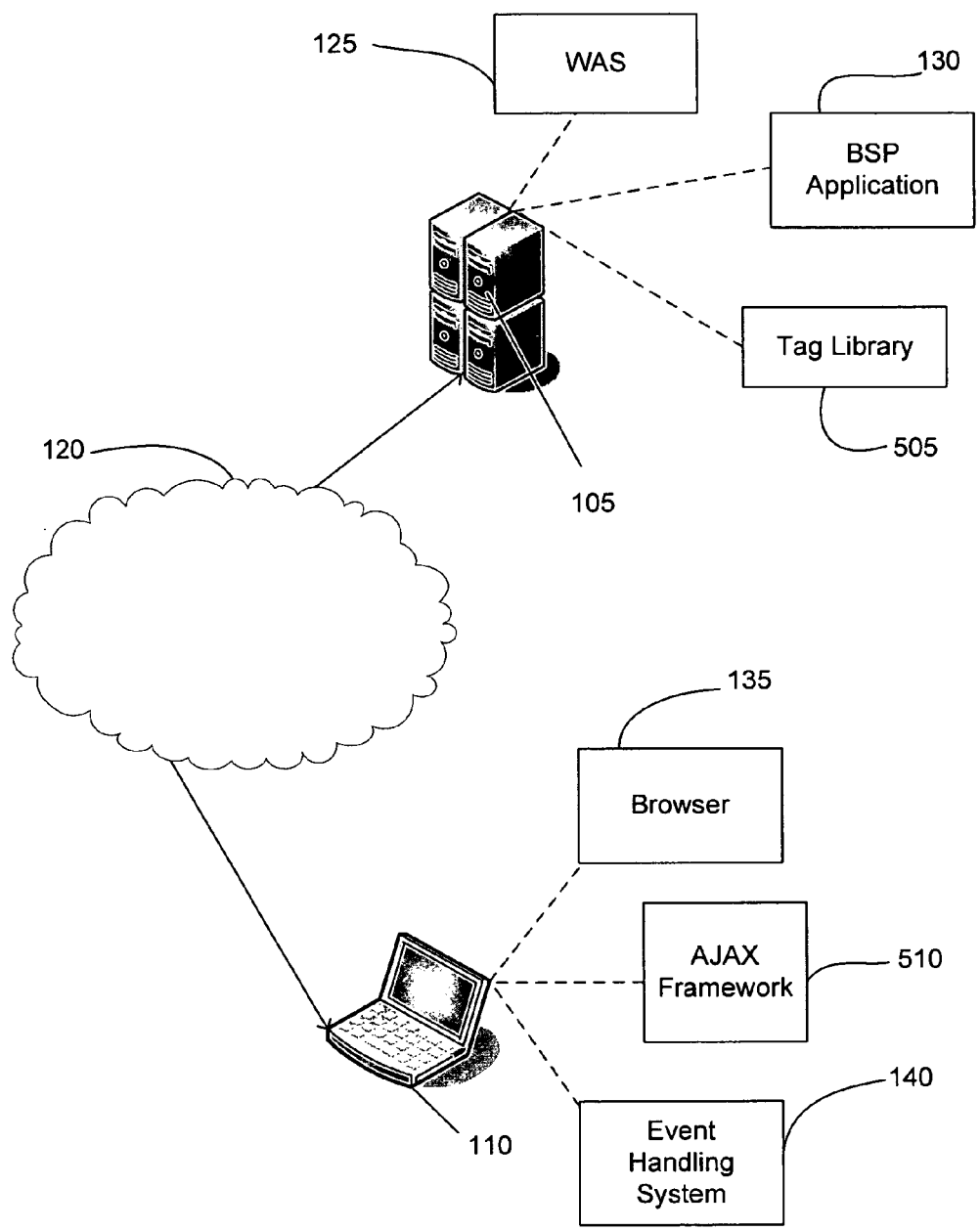
FIG. 5 is a schematic block diagram of a block diagram of a server-client system for delta rendering of content.

FIG. 5 is a block diagram of a server-client system for delta rendering of content according to one embodiment. Client 110 communicates with server 105 via network 120, which may be the Internet and the WWW. According to one embodiment, server 105 serves HTML content to client 110 using the HTTP and TCP protocols. Received HTML content is rendered on client 110 by browser 135.

As shown in FIG. 5, server 105 executes WAS process 125 through which BSP application 130 is provided to client 110. According to one embodiment, upon request of a BSP page by client 100, server 105 renders HTML code from view object 394 on BSP page 330 requested by client 110 and transmits the rendered HTML code to client 110. Server 105 also includes tag library 505 for marking BSP pages to indicate particular content targeted for delta rendering. The specific functions of tag library 505 will be described in more detail below.

Client 110 includes event handling system 140 for responding to events generated by user interaction with content provided by server 105. According to one embodiment, event handling system 140 utilizes JavaScript to respond and process events generated on client 110. Client 110 also includes AJAX framework 510 for performing delta handling of requests to server 105. The function of AJAX framework 510 will be described in detail below.

Figure 6:
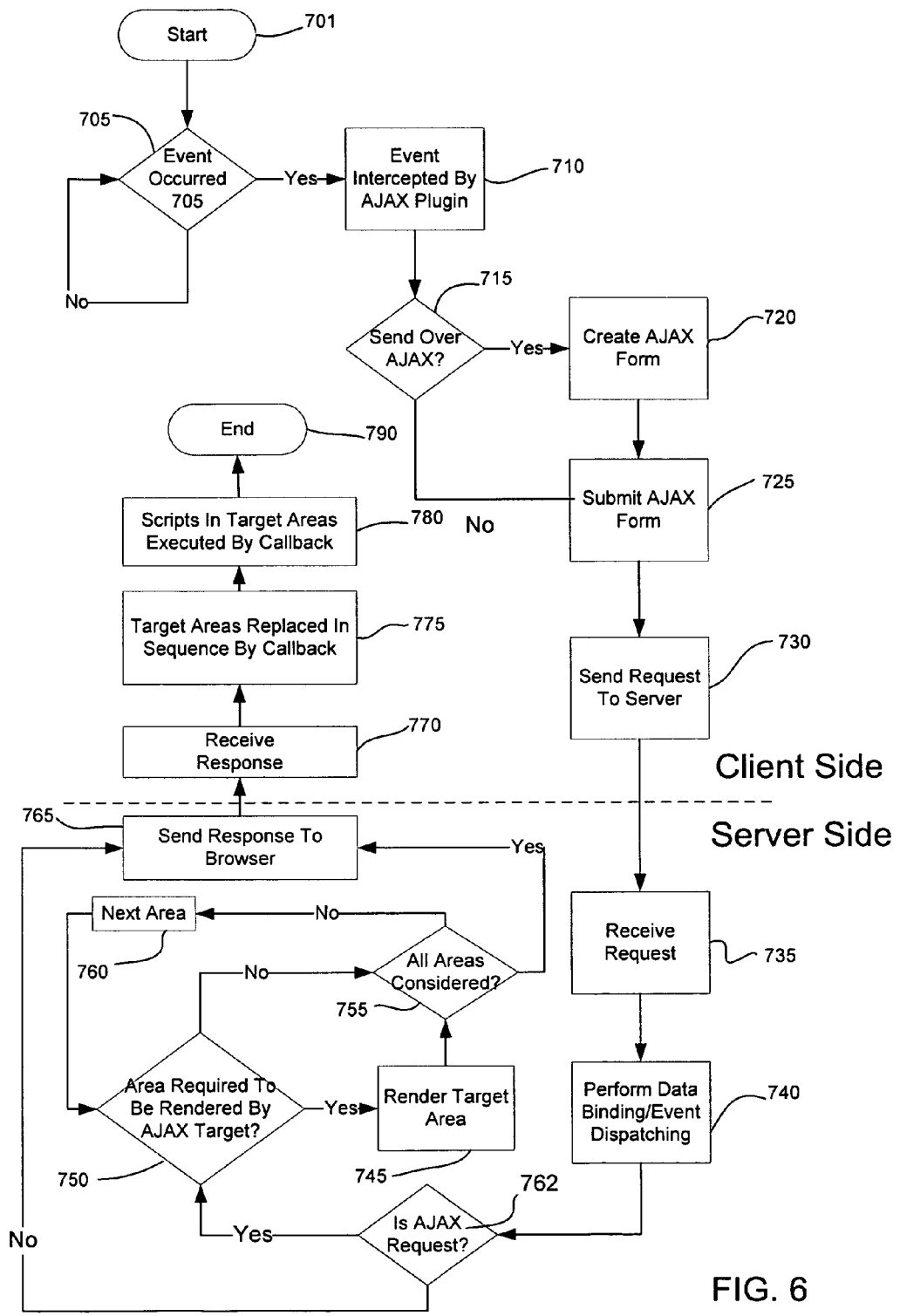
FIG. 6 is a flowchart of a process for delta rendering in a client-server application utilizing Asynchronous JavaScript and XML ("AJAX").

FIG. 6 is a flowchart of a process for delta rendering in a client-server application utilizing AJAX according to one embodiment. The process is initiated in step 701. In step 705, it is determined whether an event has occurred. An event may correspond to a user interaction with a GUI object, for example, a mouse click or entry of text into a form. If an event has occurred, ('yes' branch of step 705) in step 710, the event is intercepted by AJAX framework 510 on client 105. If not ('no' branch of step 705), event detection may be repeated in step 705. In step 715 it may be determined whether the AJAX request should be made. Determination of whether an AJAX request should be made may depend upon whether a global variable has been set indicating that delta handling using AJAX should be used. If so ('yes' branch of step 715), an AJAX form may be created in step 720. If not ('no' branch of step 715), event detection may be repeated in step 705. In step 725, the AJAX form may be submitted and in step 730, the request may be sent to the server.

In step 735 the request may be received by the server. In step 740, the server may perform data binding/event dispatching. In step 762, it is determined whether the request is an AJAX request. If not ('no' branch of step 762), flow continues with step 765. Otherwise, if the request is to be handled by AJAX, flow continues with step 750. In step 750, it may be determined whether an area to be rendered is a target of the AJAX request. The concept of an area will be described in detail below. For the present discussion it is sufficient to understand that an area may represent a portion or segment of a Web page. If so ('yes' branch of step 750), the target area may be rendered in step 745. If not ('no' branch of step 750), control may pass to step 755 and it may be determined whether all areas have been considered. If not ('no' branch of step 755), the next area may be considered in step 760. If so ('yes' branch of step 755), the response may be sent to the client in step 765.

In step 770, the client may receive the response. In step 775, the target areas may be replaced in sequence by a callback function on the client. In step 780, any scripts in target areas may be executed by a callback function at the client. The process ends in step 790.

Referring again to FIG. 3b, according to one embodiment, each view object 394 for a BSP page 348 may include code for generating one or more objects that will be displayed on a client device 110 to allow interaction with BSP application 330. The objects may be GUI objects such as tables, list boxes, combo boxes, etc. According to one embodiment, the code for a view object 394 for a BSP page 348 may be compiled into HTML code or another presentation language code when the BSP page 348 is requested by client 110.

Figure 7A:
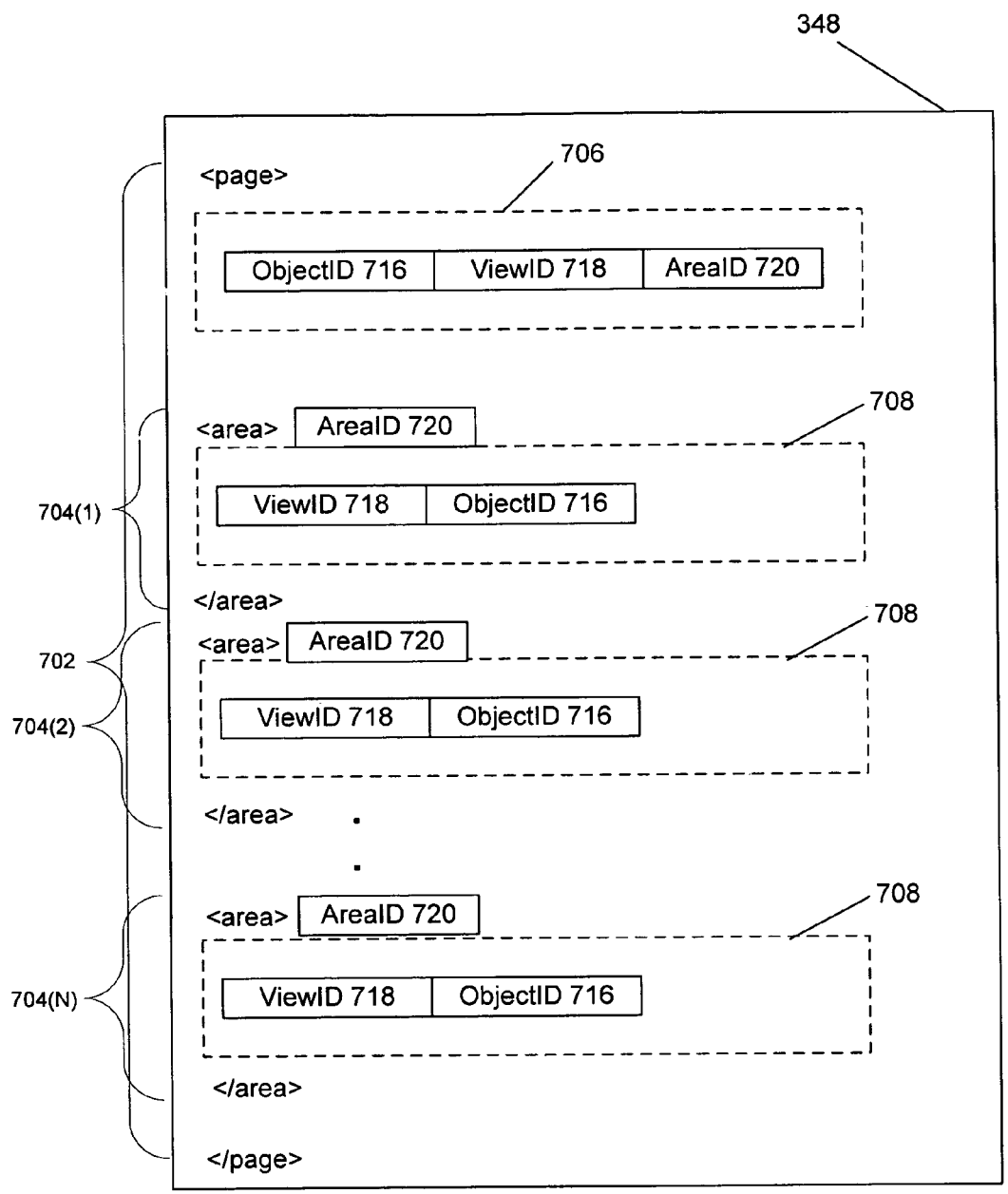
FIG. 7a is a schematic block diagram of a BSP page having tags to provide for delta updates.

Referring now to FIG. 7a, in order to provide delta handing, tag library 505 provides a  tag 702 and <area> tag 704, which may be used to mark a BSP page 348. According to one embodiment each  tag 702 may correspond to one BSP page 348 and thus may correspond to a particular view object 394 corresponding to that BSP page 348. Because BSP pages may be arranged in a hierarchical structure,  tags may be nested.

<area> tags 704(1)-704(N) may be utilized to mark these portions of a view object 394 that are desired to be updated upon a delta rendering. Because upon request of a BSP page 348, presentation code is generated from view object 394, as described below the  and <area> tags may be mapped to particular portions of presentation code.

According to one embodiment the attributes in Table 1 can be defined for a  tag 702.

TABLE 1

| Attribute Name | Description of functionality |
| --- | --- |
| Id | Provides this tag with an id. This id will be generated by the central ID generation mechanism of the UI framework. A prefix to the ID filled in as a value to this field is generated. The ID filled in is appended to the generated prefix. The ID generated has a list of views that this tag is embedded in by the BSP controller hierarchy. |
| availableElements | This defines the list of areas on this page that are made available to sub-controllers for replacement. For example, the root area can have within it:<br>Message Area<br>Toolbar<br>Navigation Bar<br>Breadcrumbs<br>. . .<br>All of these areas should be available to components that reside in any subcomponent of any other area, for |

TABLE 1-continued

| Attribute Name | Description of functionality |
| --- | --- |
| | example, a component in the workarea may decide to update only the message area and an area within it's view, so the message area needs to be made available to the sub-controllers. |
| deltaHandlingEnabled | true\|false |
| interceptEvents | This tells the AJAX framework of what events from HTMLB to intercept to create AJAX requests out of them. The syntax of this follows the pattern as per below:<br>o: <object id pattern>:<target area><br>t: <event type pattern>:<target area><br>e: <event id pattern>:<target area> |
| enableScriptDelta | true\|false<br>This tells the framework of if the scripts returned by the AJAX request should be interpreted or not. |

According to one embodiment, attributes in Table 2 can be defined for an <area> tag 704.

TABLE 2

| Attribute Name | Description of functionality |
| --- | --- |
| Id | Provides this tag an id. This id will be generated by the central ID generation mechanism of the UI framework. A prefix to the ID filled in as a value to this field is generated<br>The ID filled in is appended to the generated prefix<br>The ID generated has a list of views that this tag is embedded in by the BSP controller hierarchy. |

FIG. 7a is a schematic of a view object for a BSP page utilizing  and <area> tags to provide for delta handling according to one embodiment. As shown in FIG. 7a, view object 394 includes one  tag and multiple <area> tags. This is merely illustrative and is not intended to limit the scope. View object 394 may include multiple  tags if in fact multiple BSP pages 348 are nested.

tag includes target information 706 (corresponding to interceptEvents attribute above) that specifies information for handling events generated with respect to various objects within view object 394. As noted above, objects may be various GUI objects such as buttons, list boxes, combo boxes, etc. ObjectIDs 716 may be generated for objects in view object 394 that generate events, which may require delta handling. For example, it may be desired to update only a portion of a Web page when a user interacts with a button control such as by clicking on the button. In this case, an ObjectID 716 may be associated with the button.

Target information 706 may associate each of one or more object identifiers (ObjectID) 716 with a respective view identifier (ViewID) 718 and a respective area identifier (AreaID) 720 using the following patterns:
    o: <object id pattern>:<target area>
    t: <event type pattern>:<target area>
    e: <event id pattern>:<target area>
According to one embodiment, each of the patterns mentioned above are JavaScript RegExp patterns. <object id pattern> corresponds to the combination of an ObjectID 716 and a ViewID 718. <target area> corresponds to an AreaID 720. ViewID 718 is a unique identifier generated for each BSP page 348. Because BSP pages 348 may be nested to include other BSP pages 348, a BSP page 348 may include multiple ViewIDs 718. AreaID 720 is a unique identifier that identifies each portion or segment of a Web page (marked by <area> tags) that may be the target of delta rendering.

View object 394 may include any number of <area> tags 704(1)-704(N). For example, continuing with the example noted earlier, a user's clicking on a button may cause only certain portions of a Web page to be updated. These portions may be marked by utilizing <area> tags (e.g., 704(2) and 704(4)) to designate the portions to be updated when the clicking event occurs. For example, to trap an event of the table navigation from a table with id searchResultTable, the following are valid patterns:
    o: (searchResultTable):searchResultArea
    o: (resulttable):searchResultArea, messageArea
    t: (navigat):searchResultArea
    e: (navigat):searchResultArea ,messageArea.
The target area specifies the list of target areas that should be updated as a result of this event. <area> tags 704(1)-704(N) each designate an area within view object 394. Each area is associated with a unique identifier (AreaID 720) corresponding to id attribute above. Object definitions 708(1)-708(N) may be encapsulated within <area> tags. For illustrative purposes only, as shown in FIG. 7a, only one object definition 708(1)-708(N) is respectively encapsulated in each <area> tag 704(1)-704(N). However, it should be understood that there may be several object definitions within any one <area> tag.

Each object definition 708 corresponds to a particular GUI object (e.g., user interface control such as a button) on BSP page 348. Each object definition 708(1)-708(N) associates an ObjectID 716 corresponding to that object with a ViewID 718 in which that object is to be displayed. An object may be associated with any number of views.

Figure 7B:
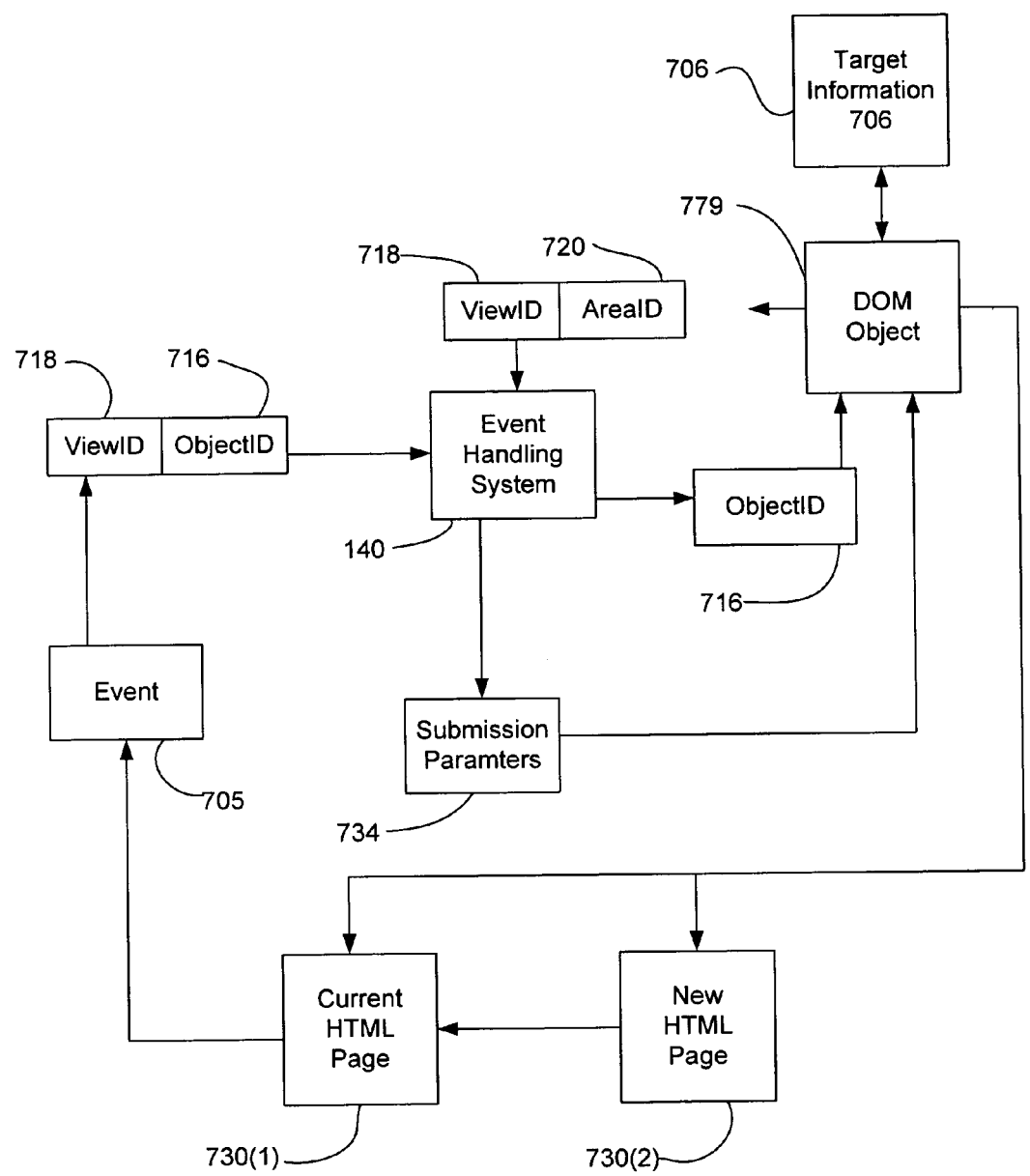
FIG. 7b is a schematic block diagram of components involved in a process for associating an event with at least one target area for delta rending.

FIG. 7b is a block diagram of elements involved in an exemplary process for associating an event with at least one target area for delta rending according to one embodiment. A user interacts with currently displayed HTML page 730(1). Event 705 is generated, for example by a user clicking upon a user interface control (e.g., a button) on currently displayed HTML page 730(1). Event handling system 140 detects event 705 and receives ObjectID 716 corresponding to the object generating the event and ViewID 718 corresponding to the view associated with the object. As noted earlier, ObjectID 716 and ViewID 718 correspond to objects on BSP page 348 and may be encapsulated in an <area> tag 704.

As described above, target information 706 may associate each of one or more object identifiers (ObjectID) 716 with a respective view identifier (ViewID) 718 and a respective area identifier (AreaID) 720. ObjectID 716 detected by event handling system 140 is used to query DOM object 779, which retrieves at least one ViewID 718 and AreaID 720 associated with the ObjectID 716 in target information 706. Event handling system 140 then generates submission parameters 734 as a function of retrieved ViewID 718 and AreaID 720. As will be described below, submission parameters are provided to server 105, which may utilize these parameters to perform server-side optimization (described in detail below). Submission parameters are passed to server 105, which returns HTML code generated from a BSP page.

Upon receiving HTML code 730(2) from server (not shown), ViewID 718 and AreaID 720 are utilized to perform replacement of areas on new HTML page 730(2) corresponding to the target information 706 associated with ObjectID 716. According to one embodiment, event handling system 140 performs this replacement by making requests to DOM object 779.

Figure 7C:
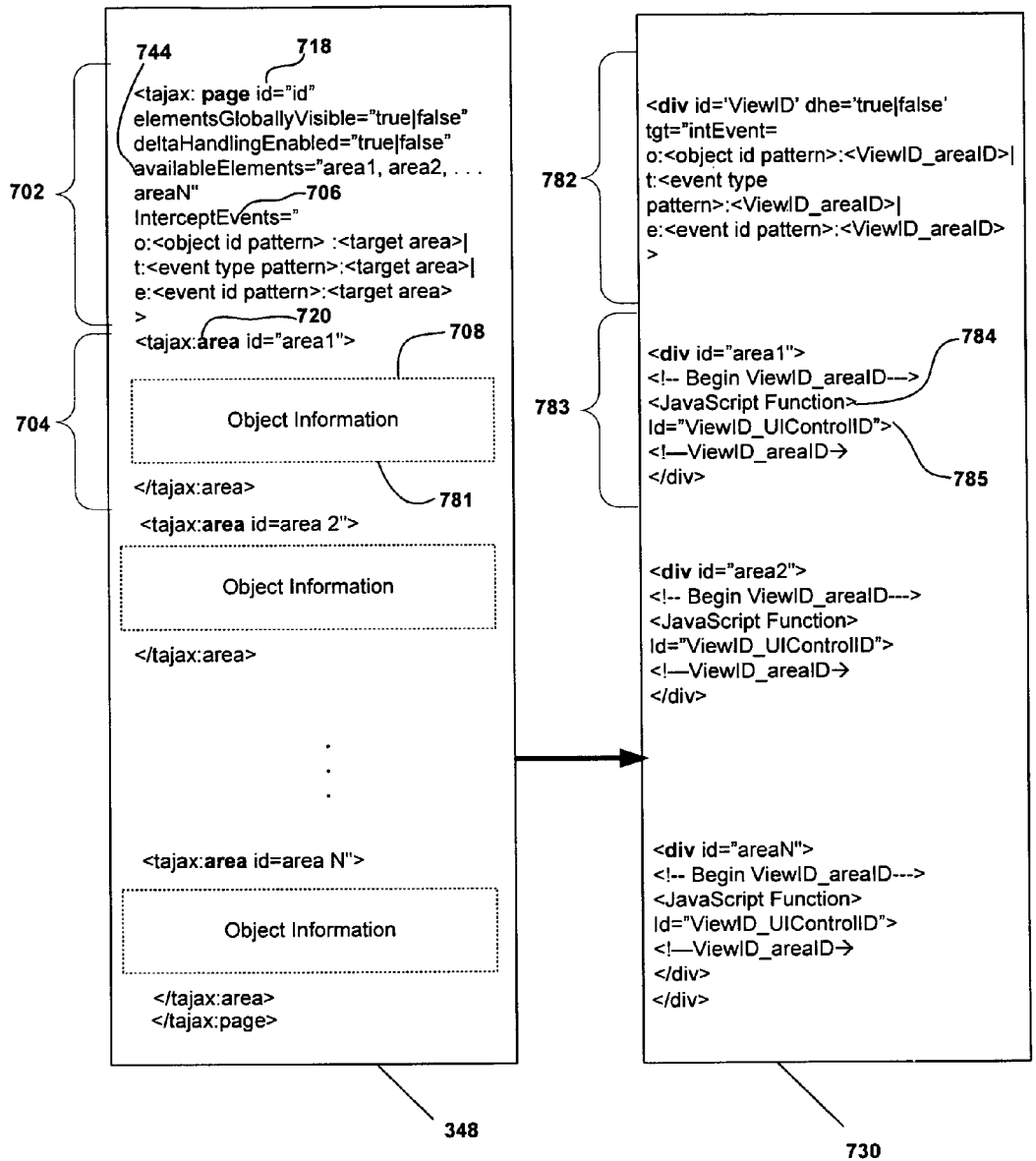
FIG. 7c is a listing of code of a BSP page in relation to a code of a rendered HTML page.

FIG. 7c is a schematic of a BSP page in relation to a rendered HTML page according to one embodiment. Marking information provided by tag library 505 (i.e.,  tags 702 and <area> tags 704) is inserted in a BSP page 348 to indicate target areas to be updated upon occurrence of an event. Upon a request of a BSP page 348, the marking information is translated into corresponding marking information in a presentation language such as HTML. This marking information in the rendered HTML page (e.g., <div> tags) can be located, modified and/or replaced by the DOM object 779 on client 110 upon detection of an event 140. HTML page 730 is rendered from BSP 384 when BSP page is requested. Rendered HTML page 730 includes <div> tags corresponding to the  and <area> tags in BSP page 384.

For each BSP page 384 a  tag 702 comprising a number of attributes (described above) is provided.  tag 702 includes ID 718, which is a unique identifier associated with the  tag. In addition,  tag 702 includes "availableElements" identifier 744, which indicates all areas on BSP page 348. Thus, for example, as shown in FIG. 7c, "availableElements" identifier 744 in  tag 702 indicates that N areas exist on BSP page 348.  tag 702 includes target information 706 denoted by the "InterceptEvents" identifier, which specifies all target areas for events generated by particular objects (e.g., a user interface control). The nature of target information 706 is described above.

Each BSP page 384 may include one or more area> tags 704. Each <area> tag (e.g., 704) includes an "id" attribute corresponding to AreaID 720. Further, each <area> tag 704 may encapsulate object information 708 for objects such as UI controls (e.g., 781).

FIG. 7c shows a rendered HTML page 730 from BSP page 384. For each  tag 702 a corresponding <div> tag 782 is generated in HTML page 730 (e.g., 782). Generated <div> tag 782 includes a "tgt" attribute corresponding to the "InterceptEvents" attribute in the  tag. According to one embodiment, for each ObjectID 702, EvenTypeID or EventID, an identifier is generated with a prefix corresponding to ViewID 718 and a suffix corresponding to the AreaID 728 as follows:

ViewID_AreaID

In addition, a <div> tag 783 in HTML code 730 is generated for each <area> tag 704 in BSP 384. An "id" attribute is set to the AreaID 728. In addition, for any object an identifier is generated with a prefix corresponding to ViewID 718 and a suffix corresponding to the ObjectID 716 (e.g., 785) as follows:

ViewID_UIControlID

Also, shown in FIG. 7c is an embedded JavaScript function 784, which may be executed inline while processing the server response for processing that specific area.

Figure 7D:
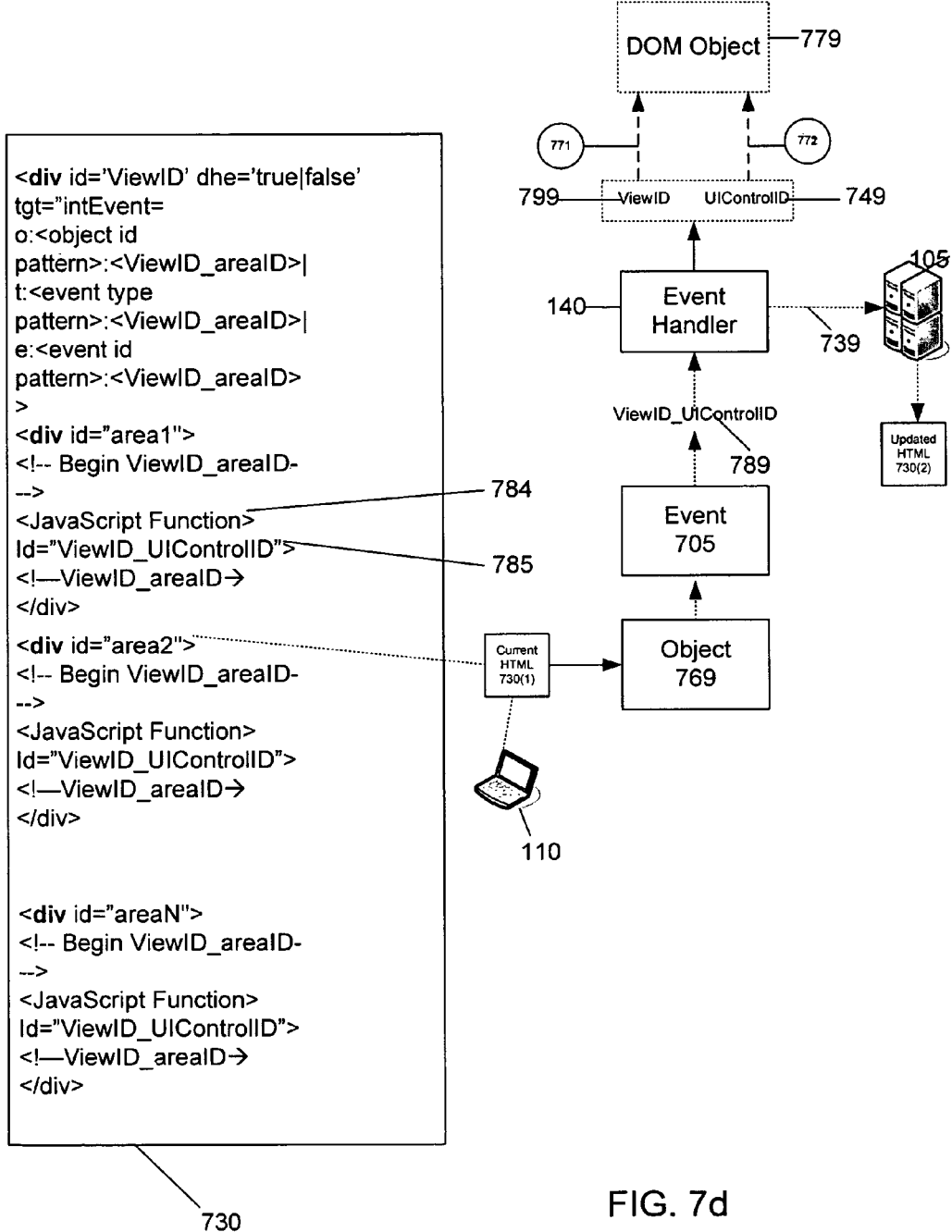
FIG. 7d is a diagram of code of a HTML page and components involved in a process for associating an event with at least one target area for delta rendering, in which relationships between marking information in the HTML page and target areas to be updated are shown.

FIG. 7d is a schematic showing how target areas to be updated are determined upon occurrence of an event utilizing the marking information in a Web page according to one embodiment. Current HTML page 730(1) resides at the client device 110. Event 705 is generated with respect to object 769 on current .HTML Web page 730(1). Object 769 may be, for example, a UI control such as a button, a table, an input text box, etc.

Upon occurrence of an event 705, event handler 140 is provided with an identifier 789 associated with the object 769 triggering the event. Event handler 140 may correspond to JavaScript function 784. As indicated with respect to FIG. 7a, this provided identifier 789 comprises prefixing a particular view identifier with a suffix comprising the object identifier.

Event handler 140 decomposes the combined view identifier/object identifier into component parts including ViewID 799 and UIControlId 749. Event handler 140 then locates the associated <div> tag associated with the  tag (from the BSP page) by querying DOM object 779 using ViewID 799 (over pathway 771). In addition, DOM object 779 provides associated target information for the event by querying DOM object using UIControlID 749 (i.e., an object ID) (over pathway 772). The filter information indicates areas on the Web page to be updated (e.g., area2).

Event handler 140 makes a request to server 105 for the current BSP page by generating URL 739, which encodes various submission parameters (described in detail below). According to one embodiment, the request to server 105 may be made over a TCP/IP socket connection. Server 105 responds by providing updated HTML page 730(2). Updated HTML page 730(2) is then parsed by event handler utilizing DOM object 779 to locate the target areas to be updated (using the filter information determined earlier). The target areas on current Web page 730(1) are then replaced with the corresponding HTML code from updated Web page 730(2).

Figure 7E:
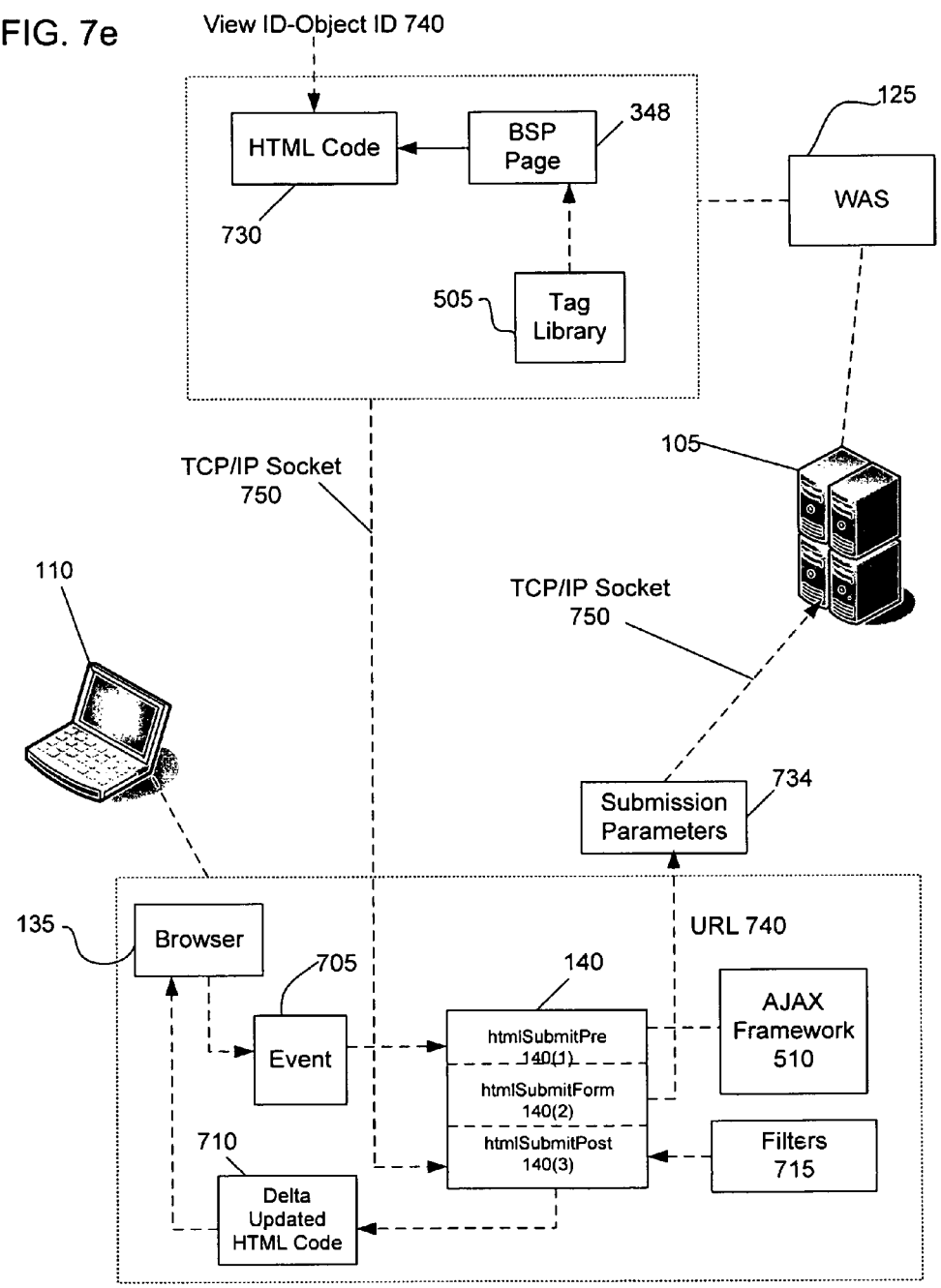
FIG. 7e is a schematic block diagram of components of a system for performing delta-rendering in a client-server application utilizing AJAX.

FIG. 7e is a block diagram depicting a set of components for performing delta-rendering in a client-server application utilizing AJAX according to one embodiment. At client 110, event 705 is generated by a user's (not shown) interaction with browser 135 running on client 110. Event handling system 140 handles event 705 via htmlSubmitPre function 140(1), which among other things determines whether AJAX framework 510 should be employed, and if so, generates submission parameters 720. According to one embodiment, htmlSubmitPre 140(1) receives an event object ID corresponding to event 705 and generates one or more view IDs corresponding to object ID, which are update targets for that event. A detailed description of a htmlSubmitPre 140(1) function is provided below.

Among other things, submission parameters 720 include one or more targets, which are to be updated as a result of event 705. A detailed description of submission parameters 720 is provided below. htmlSubmitForm 140(2) is then called, which submits submission parameters 734 to server 105 and requests rendering of the appropriate BSP page 348. The relevant BSP page 348 is reflected in a URL 740 corresponding to BSP page 348 requested via htlmSubmitForm 140(2). According to one embodiment, the request from client 110 to server 105 is not made directly through browser 135 but is effected via functionality provided by AJAX framework 510, which opens a secure TCP/IP socket connection 750 and submits the request via that connection.

Server stores BSP page 348, which has been tagged via tag library 505 to mark areas that are targeted to be updated as a result of various events that may occur with respect to BSP page 348. The nature of particular tags and their relationship to BSP page 348 is described in detail below.

On server 105 submission parameters 720 are received by WAS 125. WAS 125 causes the appropriate BSP page 348 to be rendered as HTML code 730. According to one embodiment, as a result of the rendering process, HTML code 730 is tagged to correlate particular objects with view ID information corresponding to those objects.

HTML code is received via the deltaRendering Callback function 140(3) over TCP/IP socket connection 750, which is a callback function on client 110. htmlSubmitPost function 140(3) parses HTML code 730 and replaces only that code corresponding to targets (generated in submission parameters 720) in the current HTML code for BSP page 348 to generate delta updated HTML code 710. Delta updated HTML code 710 is then provided to browser 135 where it is rendered.

An exemplary HTML rendering of a  tag 702, which be described in detail below, is as follows:

```
<div id='C1_W1_V2_V3' dhe='false'
    tgt='C1_W1_V2_V3'><!-- Begin
C1_W1_V2_V3 -->
    Rest of the page
    <!-- C1_W1_V2_V3 --></div>
```

The following is an example of the use of  tag 702:

```
<%@extension name="tajax" prefix="tajax" %>
<tajax:page id="OvwTableView1" deltaHandlingEnabled="true">
</tajax:page>
```

The following is an example of HTML code rendered from a <area> tag 702:

```
<div id='C1_W1_V2_V3'
    dhe='false' tgt='C1_W1_V2_V3'><!-- Begin
C1_W1_V2_V3 --><div
id='C1_W1_V2_V3_zheadertestoverview'><!-- Begin
C1_W1_V2_V3_zheadertestoverview -->
    Rest of the page...
    <!-- C1_W1_V2_V3_zheadertestoverview --></div>
    <!-- C1_W1_V2_V3 --></div>
```

Although the above examples have been provided for the sake of explanation, it should be understood that many other embodiments may be implemented.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system for updating only a portion of a Web page comprising:
   at least one memory;
   at least one processor;
   a Web browser, executed by the at least one processor, adapted to query a DOM ("Document Object Model") object associated with the Web page;
   a tag library stored by the at least one memory, the tag library providing:

a first tag for identifying each view on the Web page and further associating each of a plurality of objects on the Web page with at least one target area on the Web page;

a second tag for identifying each target area on the Web page;

an event handling system adapted to receive, upon detecting a triggering event generated by user interaction with content of the Web page, a triggering object identifier and associated view identifier for a triggering object; and an event intercept system, in communication with the event handling system, adapted to update at least one target update area associated with the triggering object.

2. The system according to claim 1, wherein the event intercept system comprises an AJAX framework.

3. The system according to claim 1, wherein the event intercept system is adapted to determine an associated target update area by querying the DOM utilizing the triggering object identifier.

4. The system according to claim 1, wherein the event intercept system is adapted to communicate with a Web server utilizing a TCP ("Transmission Control Protocol") socket connection.

5. The system according to claim 4, wherein the communication with the server is asynchronous.

6. The system according to claim 1, wherein at least one object on the Web page is associated with an object identifier and a view identifier.

7. The system according to claim 4, wherein the event handling system utilizes client-side scripting language functions.

8. The system according to claim 4, wherein the event intercept system is further adapted to replace information in at least one target update area in the Web page with information in a target update area in a newly rendered Web page received from the Web server.

9. A tag library tangibly embodied on a non-transitory computer-readable storage medium for providing delta rendering of a Web page, the tag library comprising:

a first tag for identifying each view on the Web page and further associating each of a plurality of objects on the Web page with at least one target area on the Web page; and a second tag for identifying each target area on the Web page.

10. The tag library according to claim 9, wherein the second tag comprises an attribute indicating all possible target areas on the Web page.

11. The tag library of claim 9, wherein the first tag further comprises an identifier for identifying each view and a second attribute for associating an object identifier with an area identifier and a view identifier.

12. The tag library of claim 11 wherein the area identifier is associated with the view identifier by concatenating a view identifier with an area identifier.

13. The tag library according to claim 9, wherein an object identifier is associated with a view identifier by concatenating a view identifier with an object identifier.

* * * * *